United States Patent [19]

Fulmer et al.

[11] 4,237,182
[45] Dec. 2, 1980

[54] METHOD OF SEALING INTERIOR MINE SURFACE WITH A FIRE RETARDANT HYDROPHILIC POLYURETHANE FOAM AND RESULTING PRODUCT

[75] Inventors: Glenn E. Fulmer, Clarksville; Robert M. Murch, Brinklow, both of Md.

[73] Assignee: W. R. Grace & Co., New York, N.Y.

[21] Appl. No.: 956,812

[22] Filed: Nov. 2, 1978

[51] Int. Cl.³ .......................... B32B 3/26; B32B 5/18
[52] U.S. Cl. ................................ 428/310; 52/309.4; 169/64; 252/3; 405/150; 405/303; 427/136; 427/373; 427/421; 428/921; 521/106; 521/109; 521/123; 521/906
[58] Field of Search .............. 427/136, 236, 373, 421; 106/15 FP, 18.14; 252/3, 8.1; 169/64, 44; 521/106, 109, 123, 906; 428/920, 921, 310; 52/309.4; 405/150, 303

[56] References Cited

U.S. PATENT DOCUMENTS

| | | | |
|---|---|---|---|
| 3,021,290 | 2/1962 | Gmitter et al. | 521/109 |
| 3,541,034 | 11/1970 | Fuzesi et al. | 521/123 |
| 3,648,614 | 3/1972 | Berthmann et al. | 299/12 |
| 3,892,442 | 7/1975 | Janssen | 299/12 |
| 3,927,719 | 12/1975 | Maser | 169/64 |
| 3,956,202 | 5/1976 | Iwasaki | 521/109 |
| 4,058,643 | 11/1977 | Marshall | 106/15 FP |
| 4,066,578 | 1/1978 | Murch et al. | 521/123 |
| 4,097,400 | 6/1978 | Wortmann | 521/106 |
| 4,105,594 | 8/1978 | Dieterich et al. | 521/106 |

FOREIGN PATENT DOCUMENTS 1429711 3/1976 United Kingdom ............... 521/82

*Primary Examiner*—John D. Smith
*Assistant Examiner*—S. L. Childs
*Attorney, Agent, or Firm*—Edward J. Cabic

[57] ABSTRACT

A fire-retarding polyurethane foam is applied to the interior surfaces of a mine such as mine shafts, entries and tunnels. The coating is applied by spraying a mixture of foam-forming ingredients including a hydrophilic polyoxyalkylene urethane prepolymer and a large amount of an aqueous slurry containing a phosphorous compound, alumina trihydrate and a char-forming material such as starch or wood cellulose. The foam coating acts as a protective sealant, and it can also be applied on other surfaces where insulation and fire retardancy are desired.

22 Claims, No Drawings

METHOD OF SEALING INTERIOR MINE SURFACE WITH A FIRE RETARDANT HYDROPHILIC POLYURETHANE FOAM AND RESULTING PRODUCT

REFERENCE TO RELATED APPLICATIONS

Commonly assigned U.S. patent application Ser. No. 950,038, filed Oct. 10, 1978, a continuation-in-part of application Ser. No. 795,216, filed May 9, 1977, now abandoned, discloses polyurethane foams which are used according to the present invention.

BACKGROUND OF THE INVENTION

1. Field of the Invention

This invention relates to a fire-resisting mine sealant made of a polyurethane foam containing a large loading of an inorganic material such as aluminum hydrate, a phosphorous compound and having a small amount of a char enhancer present. By spray coating the interior surface of a mine, such as the shafts, entries or tunnels, with this polyurethane foam forming material, a foam coating is formed which seals these interior surfaces against the effects of air and moisture on the rock. In addition, the coating layer reduces the tendency for the rock to weaken and fall to the ground and, more importantly, the coating resists burning as measured by burning tests. These tests, however, are not intended to reflect hazards presented by this or any other material under actual fire conditions.

2. Description of the Prior Art

In the 1950's and 1960's polyurethane foams were used as mine sealants. See "Rigid Foams for Mines", by Donald W. Mitchell et al, U.S. Dept. of the Interior, Bureau of Mines 1964. However, as a result of disastrous fires in mine tunnels, where these foams rapidly burned and produced a hazard to miners, they are not now generally used to provide a uniform mine sealant coating throughout the mine. See, for example, "Fire Hazards of Urethane Foam in Mines", by Donald W. Mitchell et al, U.S. Dept. of the Interior, Bureau of Mines 1966.

Instead, other fire-resistant materials have been employed, such as cement coatings. While these materials are commercially sold and used, they are not flexible coatings. It would be advantageous to have a polyurethane type of foam that could be easily sprayed in place and which would not only fill in all of the cracks and crevices, but also maintain the coating intact even when the mine surfaces shift slightly over a period of time.

3. Objects of the Invention

It is an object of the present invention to provide mine sealant coatings which are more fire resisting than polyurethane foams by utilizing special polyurethane foam-producing reactants which permit the incorporation of large quantities of selective additives to provide fire retardancy.

It is a further object of the invention to provide a flexible polyurethane foam coating to be used as a mine sealant which is able to accomodate shifts in the earth's structure over time so as to maintain a satisfactory coating on the exposed surfaces in the interior of the mine to reduce the tendency of the rock to weaken and fall.

It is also an object of the invention to provide a foam coating to seal the surfaces of mine shafts, entries or tunnels which is easy to apply by spraying. A spray gun can mix a prepolymer supplied under pressure from one source with a water phase containing at least some of the additives applied from a second source.

It is also an object of this invention to spray onto a substrate a fire-resisting polyurethane foam having a large inorganic content to provide insulation for use in buildings and for other insulating purposes.

These and other uses will become evident from the following detailed disclosure.

SUMMARY OF THE INVENTION

This invention provides a coating suitable for use as a mine sealant or for insulation by coating a substrate such as a building. The coating is made of a fire-retardant polyurethane foam prepared by reacting a hydrophilic polyoxyalkylene urethane prepolymer under foam-forming conditions at ambient temperature with at least 6.5 moles of water for every mole of NCO group in the prepolymer. The foam-forming reaction is carried out in the presence of a large amount of alumina trihydrate with a phosphorous fire-retardant compound added to impart fire-retardancy and a combustible and water-dispersible organic carbon compound having from about 0.1 to about 1.0 hydroxyl groups for every carbon atom present in the compound added to provide char enhancement.

The aqueous phase contains at least two of these three types of additives, and it can be sprayed under pressure along with the prepolymer through a nozzle to form a reactive mixture on the substrate such as a mine shaft, entry or tunnel. This mixture reacts and forms a foam having a preferred coating depth of about one inch. This coating in mine applications seals the mine surface and prevents moisture from contacting the interior surface of the mine. In building applications it provides a fire-resisting insulating layer.

DETAILED DESCRIPTION OF THE INVENTION

This invention relates to the discovery of the ability to successfully spray a mixture of reactants that produces a fire-resisting foam when applied as a coating. The preferred fire resisting foam to be deposited is the multi-component polyurethane foam described in commonly assigned U.S. patent application Ser. No. 950,038, filed Oct. 10, 1978, which is incorporated herein by reference.

There, polyurethane foams are disclosed with the required fire-resistant additives. The polyether polyurethane prepolymers employed are hydrophilic, i.e., usually at least 40 mole precent of the oxyalkylene units in the prepolymer backbone are oxyethylene units with the balance being oxypropylene, oxybutylene or other oxyalkylene units. In the resulting polyurethane foams, the branch-points of the polymer chains are connected by essentially linear polyoxyalkylene chains containing at least 40 mole percent of oxyethylene units (excluding initiators at branch-points) as described above. Where the oxyethylene content is from about 60 to 75 mole percent, it may be desirable to use a surfactant to be discussed below to promote dispersion of the prepolymer in water prior to foaming.

The foams are based on the prepolymer technique. Suitable prepolymers are prepared by capping a polyoxyalkylene polyol with an excess of polyisocyanate, e.g., toluene diisocyanate. Prior to capping, the polyol preferably has a molecular weight of from about 200 to about 20,000 and more preferably from about 600 to about 6,000. The hydroxy functionality of the polyol and the corresponding isocyanate functionality following capping is from about 2 upwards, usually not exceeding about 8. If foams are formed from prepolymers with an isocyanate functionality of about 2, the resulting foam is essentially linear and does not have as much tensile strength as crosslinked foams. Accordingly, if the isocyanate functionality is about 2, a crosslinker can be employed, although the linear non-crosslinked foams are operable in the present invention. Suitable crosslinkers are well known in the polyurethane art and include by way of example tolylene-2,4,6-triamine, ethylene diamine, diethanolamine, diethylenetriamine, triethylene-tetramine, tetraethylenepentamine, and ethanolamine.

Examples of suitable polyols, isocyanates and initiators are listed in the referenced patent application. Useful polyols include linear branched polyfunctional polyols together with an initiator or crosslinker. A specific example is a mixture of polyethylene glycol (m.w. about 1,000) with trimethylolpropane, trimethylolethane or glycerine. This mixture can be subsequently reacted with excess polyisocyanate to provide the prepolymer. Alternatively, the linear or branched polyols, (e.g., polyethylene glycol) can be reacted separately with excess polyisocyanate. The initiator, e.g., trimethylolpropane, can also be separately reacted with polyisocyanate. Subsequently, the two capped materials can be combined to form the prepolymer.

Suitable polyisocyanates useful in preparing prepolymers include toluene-2,4-diisocyanate, toluene-2,6-diisocyanate, commercial mixtures of toluene-2,4- and 2,6-diisocyanates, and additional diisocyanates and triisocyanates listed in the referenced patent application.

In obtaining prepolymers described in the referenced patent application, excess toluene diisocyanate (TDI) can be added to insure adequate curing of the foam and to reduce the density of the foam. Since toluene diisocyanate is toxic and has a low vapor pressure, it is preferred in mining applications not to use excess TDI. Instead, another diisocyanate type material having a lower vapor pressure is added to provide the desired excess diisocyanate. One example of such a substitute material is Isonate 143L made by Upjohn Polymer Chemical Co. This is a modified diphenylmethane diisocyanate containing a high percentage of pure diphenylmethane diisocyanate and a lesser amount of polycarbodiimide adducts. Another example is PAPI 135, a polyarylpolyisocyanate made by Upjohn.

From about 50 to about 400 parts of alumina trihydrate are employed, and preferably from about 100 to about 275 parts per 100 parts of prepolymer. Satisfactory alumina trihydrate (also called hydrated alumina or alumina hydrate) is highly refined, inorganic white granular crystalline powder with the chemical formula of $Al_2O_3.3H_2O$. Such material is produced by the Bayer process from bauxite ore and may contain small amounts of soda, iron oxide and silica. Suitable alumina trihydrates as described above are chemically inert and frequently are employed as inert fillers. Generally, the alumina trihydrate is employed in particulate form with an average particle size of from about 0.5 to about 120 microns. Particles of about 5 to about 20 microns are particularly useful.

The phosphorous-containing additive is employed at levels of from about 1 to about 40 parts by weight and preferably at about 5 to about 20 parts. Suitable phosphorous-containing compounds include phosphites, polyphosphites, ammonium phosphates, polyphosphates, phosphate salts, organic phosphates, phosphonates, and polyphosphonates, and mixtures thereof. Additional phosphorous compounds are more fully described in U.S. Pat. No. 4,066,578, incorporated herein by reference.

The carbon compound employed must haven an OH/C mole ratio of at least 0.1:1 and preferably from about 0.3:1 to about 0.8:1. The carbon compound must also be water-dispersible to the extent that it is either soluble or miscible with water or it can be dispersed in water with the aid of common surfactants so that the foam can be uniformly protected. In general, the total amount of the carbon compound employed should reach at least about 5 parts by weight to provide any benefit. However, if the amount of carbon compound employed is too great, the flame-retardant contribution of the alumina-phosphorous compounds will be overcome. Therefore, the upper limit on the amount of carbon compound employed is about 30 parts by weight. Preferably from about 10 to about 25 parts are employed. When using wood cellulose a lower amount can be employed from about 2 to 10 parts with a preferred range of 4 to 5 parts.

Suitable carbon compounds include aliphatic alcohols having at least two hydroxyl groups per mole, and also include "aromatic" alcohols, i.e., phenols. Suitable aliphatic alcohols may be exemplified as follows: pentaerythritol, (mono-, di-, tripentaerythritol), methylene glycol, glycerine, polyvinyl alcohol, trimethylolpropane, erythritol, arabitol, triethanol amine, and methylol melamine. Suitable saccharides include: starch, sorbitol, dextrin, flour, cellulose (including wood cellulose and its ground form, known as wood flour), mannitol, sucrose, inositol, and arabinose. Suitable phelols, (i.e., aromatic hydroxyl compounds) include: resorcinol, lignin, hydroquinol, trimethylolbenzene, pyrogallol, catechol, and phloroglucinol. If undue thickening action occurs in the aqueous phase through use of any of the above carbon compounds, the amount of the compound employed should be reduced to permit adeqaute processing.

In the present specification and especially in the following description of the various components employed in the foams, reference to "parts" or "parts by weight" refers to parts by weight based on 100 parts by weight of the urethane prepolymer employed.

Preparation of the sealant coating foams according to the invention is illustrated in the examples. Preferably it starts by dissolving or dispersing the phosphorous compound in the urethane prepolymer although the phosphorous compound can be added to the water phase. The alumina hydrate and the carbon compound are dispersed in water. Subsequently the two phases are combined as a reactant mixture which is sprayed to produce the foam. As described in U.S. Pat. No. 4,066,578 referred to above, a suspending agent for the alumina trihydrate is generally included in the aqueous phase. The use of such a surfactant is optional. A surfactant can also be included in the organic phase. The suspending agent for the alumina trihydrate is generally a non-ionic surfactant, whereas any surfactant included in the organic or aqueous phases to influence cell size or structure is a non-ionic, cationic or amphoteric surfactant. The surfactant should not be anionic. From about 0.1 to about 2 parts of the non-ionic suspending agent are employed, and from about 0.01 to about 2 parts of the non-ionic, cationic or amphoteric surfactant are employed.

Suitable non-ionic surfactants/suspending agents, often described as solution thickeners, include but are not limited to non-ionic cellulosic polymers such as hydroxyethyl cellulose polymers (e.g., Natrosol by Hercules or Cellosize by Union Carbide), hydroxypropyl cellulose (e.g., Klucell by Hercules), ethylhydroxyethyl cellulose (e.g., EHEC by Hercules), and ethyl cellulose. In addition to non-ionic cellulosic polymers, other appropriate non-ionic suspending agents include water-soluble polyoxyethylene polymers (e.g., Polyox by Union Carbide), gelatin, guar gum and agar.

These suspending agents or solution thickeners are optional ingredients since the foam-forming materials could be initially formulated just prior to spraying. However, when the aqueous slurry is made in bulk and is being used over a period of days, then it is advantageous to add the suspending agent to maintain the large concentration of additives in suspension.

Examples of suitable amphoteric and cationic surfactants are set forth in U.S. Pat. No. 4,066,578, which has been incorporated by reference into the present application. Suitable non-ionic surfactants include sorbitan trioleate (e.g., Arlacel 85 by ICI), polyoxyethylene sorbitol oleate (e.g., Atlas G 1186 by ICI), polyoxyethylene sorbitan monolaurate (e.g., Tween 21 by ICI), polyoxyethylene lauryl ether (e.g., Brij 30 by ICI), polyoxyethylene stearyl ether (e.g., Brij 72 by ICI), silicon glycol copolymer (Dow Corning 190), fluorochemical surfactants (e.g., Zonyl FAN by E. I. du Pont), condensates of ethylene oxide and propylene oxide with propylene glycol (e.g., Pluronic L62, Pluronic L64, Pluronic P75 by BASF Wyandotte), and organosilicone surfactants (e.g., L520 by Union Carbide).

The fire-retardant polyurethane foams prepared by the invention have numerous advantages. Specifically, it is believed that the chars are stronger and more resistant to removal as described earlier. Additionally, many of the foams, while containing appreciable quantities of particulate and normally "dusty" additives, are relatively non-dusty, especially in comparison to foams loaded to similar levels but not utilizing the invention. Additionally, the carbon compound employed along with the alumina trihydrate and phosphorous compounds exhibit good resistance to leaching. Foams prepared according to the invention are generally open celled and may be rigid, semi-rigid or flexible, depending upon the level of crosslinker and amounts of additives employed. Techniques for achieving various cell structures and the various degrees of rigidity of polyurethane foams are well known and do not form part of the present invention.

The spraying of the foam reactant materials can be done with spray equipment using either high pressure airless spray or with lower pressures by use of an additional air blast. Since the prepolymer and the water will react to product the foam soon after mixing, it will be necessary to use spray equipment in which these two materials are separated either until the time of spraying or just before the materials are sprayed from the spray gun applicator.

A Graco Airless spray gun manufactured by Graco Inc., Minneapolis, Minnesota has been used to give satisfactory coatings. This spray gun is characterized by having one supply tank in which the prepolymer is maintained under pressure and a second tank in which the water phase containing the alumina hydroxide and char forming carbon compound is also maintained under pressure. The two ingredients are forced under substantial pressure of about 1500 to 3000 p.s.i. up into the gun where they pass through a Kenix motionless mixer and then pass out through the nozzle to be sprayed onto the substrate. Using the Graco Airless spray gun, a mixture is applied which expands to produce a foam coating of approximately one-fourth to one inch onto a substrate. The spray gun can be positioned approximately two to four feet from the substrate. Using the Graco device, a panel three feet by five feet can be coated in about two minutes.

The mixture can also be sprayed under considerably less pressure by separately pumping the aqueous phase and the prepolymer in metered amounts to a Kinex motionless mixer and then applying a blast of air such as at a pressure of about 100 p.s.i., to the mixture to spray or splatter the coating material to the substrate.

Other spraying devices can be used if they are capable of metering, mixing and spraying highly viscous materials and so long as they maintain the prepolymer and the water phase separate and apart until just before the foam coating is to be applied.

When using the Graco Airless spray gun, satisfactory foam coatings were obtained at a ratio of one part by volume of prepolymer to 2 parts by volume of the aqueous slurry. However, other volume proportions also produce successful coatings. For example, a satisfactory coating has been achieved using other spray equipment with 10 volume parts of aqueous slurry to one volume part of prepolymer. The reason for the incorporation of large amounts of the inorganic materials into the foam is due to the utilization of large, excessive amounts of water to foam the prepolymer. In the process of applying the large amounts of water, the prepolymer is diluted out to cover a large volume in which the foam is being formed and within this large volume there can be a substantial amount of dissolved or suspended inorganic material enclosed.

After the foam reactants have been sprayed from the gun, the line through which the prepolymer has been applied can be flushed clean with a solvent such as methylene chloride.

TEST METHODS

A. Limiting Oxygen Index (LOI) is determined by the modification of ASTM D2863-74 described by Beatorewicz and Hughes, *Journal of Fire and Flammability* 2 259 (1971).

B. Fire Test similating a mine tunnel. The Factory Mutual Corner test is a standard test utilizing two walls forming a corner with a top ceiling attached. Each wall is 25 feet high, with one wall 35 feet long and the other 50 feet. The coating to be tested is applied to the inside of this corner structure and then 750 pounds of wood pallets are piled in the corner. The pallets are ignited, and the test is successfully passed if the coating withstands contact with the fire for a minimum of 15 minutes. This test procedure is described by Factory Mutual Research in their June 1972 publication "Factory Mutual Building Corner Fire Test Procedure."

This test is expensive and requires a very large test structure. The Bureau of Mines earlier developed a very vigorous fire test procedure to qualify potential mine sealant candidates, based on the principle that even the most fire-resistant conventional polyurethanes will fail when two coated surfaces are joined so a fire burning on one surface will inpinge upon another such as, for example, a wall and a ceiling. They built a test tunnel, approximately six feet high by 12 feet wide by 100 feet long. The coating to be tested is sprayed on the ceiling and both sides of the tunnel and then ignited using burning methyl alcohol as the ignition source. They found that once ignition had occurred on the foam surface adjacent to the ignition source the flame propagated and spread rapidly along both that surface and any adjoining surfaces.

Since both of these tests are expensive, a miniature test has been devised using a smaller chamber to also simulate a mine tunnel. The test chamber is made of plywood and has four sections two feet by eight feet long, the sections being connected by hinges. The inside of these four walls are spray coated, and the four sides are folded and arranged to form the rectangular two feet by two feet by eight feet test chamber. One pint of methanol in a 12 inch by 18 inch dish is used as the ignition source inside one end to provide conditions at least as vigorous as the larger test tunnel. This mini-tunnel was tilted at a slight angle to increase the chimney effect, and an air flow was provided by a 10-inch fan. This fire test is only a small scale test and, of course, should not be construed to represent the behavior of these materials in an actual mine fire.

TRADE NAMES USED IN THE EXAMPLES

Antiblaze 28—chloroethyl phosphonate oligomer by Mobil

FC 170—fluorinated alkyl polyoxyethylene ethanols by 3M

Isonate 143L—diphenylmethane diisocyanate with a small amount of polycarbodiimide adducts by Upjohn Natrosol 250HH—hydroxyethyl cellulose by Hercules Phoschek P/30—ammonium polyphosphate by Monsanto Pluronic L-62—condensate of ethylene oxide and propylene oxide with propylene glycol by BASF Wyandotte Proxcel CRL—microbiostat presevative with 1,2-benzisothiazolin-3-one as an active ingredient by ICI

PREPARATION OF PREPOLYMERS

Prepolymer A is prepared by admixing 2 molar equivalents of polyethylene glycol having an average molecular weight of 1,000 (PEG-1,000) and 0.66 molar equivalents of trimethylolpropane (TMOP). The admixture is dried at 100°–110° C. under a pressure of 5–15 Torr to remove water. The resulting dried mixture is slowly added over a period of about one hour to a vessel containing 5.7 molar equivalents of toluene diisocyanate (TDI) while stirring the TDI and polyol mixture. The temperature is maintained at 60° C. with stirring for three additional hours. Then an additional 0.92 molar equivalent of TDI is added with stirring over a period of about one hour while maintaining the temperature at 60° C. The final reaction mixture contains a 5 percent molar excess of TDI. All hydroxyl groups are capped with isocyanate and some chain extension occurs because of crosslinking of the polyols with TDI.

Prepolymer B is prepared by admixing 2 molar equivalents of polyethylene glycol having an average molecular weight of 1,000 (PEG-1,000) and 0.67 molar equivalents of trimethylolpropane (TMOP). The admixture is dried at 100°–110° C. under a pressure of 5–15 Torr to remove water. The resulting dried mixture is slowly added over a period of about one hour to a vessel containing 5.7 molar equivalents of toluene diisocyanate (TDI) while stirring the TDI and polyol mixture. The temperature is maintained at 60° C. with stirring for three additional hours. All hydroxyl groups are capped with isocyanate and some chain extension occurred because of crosslinking of the polyols with TDI.

EXAMPLE 1

100 Parts by weight of the prepolymer A were mixed with 9 parts of Antiblaze 78 in a first container. In a second container a highly filled aqueous slurry was prepared by adding to 100 parts of water, 130 parts of alumina trihydrate manufactured by Alcoa as grade C331 having a particle size of about 6.5 to 9.5 microns, 20 parts of Phsochek P/30, and 0.7 part of Natrosol 250 NHR, which acts as a suspending agent. Also added was 0.2 part of FC-170 and 4.0 parts of Douglas Fir Bark as a char former.

The prepolymer and the aqueous slurry were sprayed in a volume ratio of 1:2 with a Graco Airless spray gun having a Kinex motionless mixer. Four 2×8 foot panels attached by hinges were each sprayed for about 5 minutes.

The four panels were air dried for about a week and then folded into the rectangular configuration to form the mini-tunnel, and the methanol was ignited according to Test Method B. The only evidence of decomposition was the slight char forming on the foam surface next to the ignition source. After seven minutes the methanol was completely consumed. There was only minor damage to the adjacent foam surface. No ignition of the foam occurred during the test.

COMPARISON EXAMPLE 2

The same type of mini-tunnel used in Example 1 was used to test a conventional polyurethane rigid foam of the type formerly sold for mine sealant applications and now used in more limited applications such as a fire stop for mines that have a fire burning in another part of the mine. The chemical components for making this rigid polyurethane foam are sold in the form of a portable dispensing unit, Rigi-Pak ™ Model 180, by the Mine Safety Appliances Company of Pittsburgh, Pennsylvania. A spray gun is connected to two pressurized tanks. One tank contains polymeric isocyanate (MDI type) and fluorocarbon, and the other contains polyols with amines and fluorocarbons. The material was sprayed from the spray gun onto the four connected wood panels. After subsequent assembly into the chamber configuration the polyurethane ignited soon after the ignition of the methanol. This initial ignition and the subsequent flashover after two minutes occurred at approximately the same time as they occurred for this same material in the larger scale Bureau of Mines test.

Fire engineers use this term "flashover" to describe the spread of fire over the whole surface, caused by the rapid ignition of volatile gases. This vigorous burning continued for two or three minutes and lightweight char formed over all four surfaces. There was some minor damage to the plywood tunnel.

EXAMPLE 3

100 Parts by weight of the prepolymer B were mixed with 16 parts of Isonate 143L in a first container. In a second container a highly filled aqueous slurry was prepared by adding to 100 parts of water the following:
alumina trihydrate (Alcoa C331)—150 parts
Phoschek P30—30 parts
Douglas Fir Bark—4 parts Pluronic L-64—2 parts
Natrosol 250 NHR—0.4 part
FC-170—0.2 part
Proxcel CRL—trace The prepolymer was heated to 55° C. and the aqueous slurry at room temperature were sprayed with the Graco Airless spray gun in a volume ratio of 1:2 onto a board covered with a sheet of polyethylene. The resulting foam had a density of 16.4 lb/ft$^3$ and an Oxygen Index of 56.2%.

EXAMPLE 4

The procedure of Example 3 was followed except that the amount of alumina trihydrate was increased to 174 parts. The resulting foam had a density of 19.1 lb/ft$^3$ and an Oxygen Index of 58.3%.

EXAMPLE 5

The procedure of Example 3 was followed except that the amount of Natrosol 250 NHR was decreased to 0.2 part. The resulting foam had a density of 12.3 lb/ft$^3$ and an Oxygen Index of 54.1%.

EXAMPLE 6

The procedure of Example 5 was followed except that the amount of alumina trihydrate was increased to 174 parts. The resulting foam had a density of 29.3 lb/ft$^3$ and an Oxygen Index of 60.4%.

EXAMPLE 7

The composition of Example 3 was coated by separately pumping the aqueous phase and the prepolymer to a Kinex mixer and then applying a blast of air at a pressure of about 100 psi to splatter the coating material onto a substrate, where a foam formed. When subjected to the Oxygen Index test, the material did not burn until the oxygen content was greater than 74%. The density of the foam was 25.7 lb/ft$^3$.

EXAMPLE 8

100 Parts by weight of prepolymer A were placed in a first container. In a second container a highly filled aqueous slurry was prepared by adding to 100 parts of water the following:
alumina trihydrate (Alcoa C331)—130 parts
Phoschek P30—15 parts
Starch—15 parts
Natrosol B 250 NHR—0.5 part
FC-170—0.02 part The prepolymer was heated to about 55° C. and the aqueous slurry at room temperature were sprayed with the Graco Airless spray gun in a volume ratio of 1:2 onto a board covering with a sheet of polyethylene. The resulting foam had a density of 21.03 lb/ft$^3$ and an Oxygen Index of 57%.

What is claimed is:

1. A method of sealing the interior surface of a mine with a fire-retarding polyurethane foam comprising spraying one the exposed surfaces of the mine, under foam-forming conditions, a foam-forming mine sealant composition comprising
   a. hydrophilic polyoxyalkylene urethane prepolymer,
   b. water in an amount of at least 20 moles of water for every mole of NCO groups in the prepolymer, and
   c. at least a three part fire-retarding additive mixture comprising
      (1) a phosphorous fire-retardant compound,
      (2) alumina trihydrate carried in the water phase, and
      (3) a water-dispersible and combustible organic carbon compound having from 0.1 to 1.0 hydroxyl group for every carbon atom present in said carbon compound, said carbon compound being carried in the water phase and being present from about 5 to about 30 parts by weight based on 100 parts by weight of the prepolymer, provided that when said carbon compound is wood cellulose it is present from about 2 to about 10 parts by weight of the prepolymer, and said carbon compound not functioning as a gelatinizing agent at the concentration employed.

2. A method as in claim 1, wherein the interior surface of a mine is a shaft, an entry or a tunnel.

3. A method as in claim 1, wherein the foam-forming reaction is carried out in the presence of a non-ionic suspending agent for the alumina trihydrate with said suspending agent being carried in the water phase in an amount not exceeding about 2 parts per 100 parts of the prepolymer.

4. A method as in claim 1, wherein the prepolymer is a mixture of a polyoxyethylene glycol and a polyhydric alcohol containing 3 or 4 hydroxyl groups per mole, said hydroxyl groups of the glycol and polyol being reacted with sufficient polyisocyanate to cap all of said hydroxyl groups.

5. A method as in claim 1, wherein the alumina trihydrate has an average particle size of about 0.5 to about 120 microns.

6. A method as in claim 1, wherein the phosphorous compound is ammonium polyphosphate.

7. A method as in claim 1, wherein the alumina trihydrate is present in an amount from about 50 to about 400 parts by weight per 100 parts by weight of the prepolymer.

8. A method as in claim 1, wherein the carbon compound is starch.

9. A method as in claim 1, wherein the carbon compound is wood cellulose.

10. A method as in claim 9, wherein the wood cellulose is present from about 2 to about 5 parts by weight of the prepolymer.

11. A fire-retarding coated mine interior comprising a mine interior surface having deposited thereon a fire-retarding polyurethane foam mine sealant prepared by
   a. mixing a foam-forming mine sealant composition comprising
      (1) hydrophilic polyoxyalkylene urethane prepolymer,
      (2) water in an amount of at least 20 moles of water for every mole of NCO groups in the prepolymer, and
      (3) at least a three-part fire-retarding additive mixture comprising
         (i) a phosphorous fire-retardant compound,
         (ii) alumina trihydrate carried in the water phase, and
         (iii) a water-dispersible and combustible organic carbon compound having from 0.1 to 1.0 hydroxyl group for every carbon atom present in said carbon compound, said carbon compound being carried in the water phase and being present from about 5 to about 30 parts by weight based on 100 parts by weight of the prepolymer, provided that when said carbon compound is wood cellulose it is present from about 2 to about 10 parts by weight of the prepolymer, and said carbon compound not functioning as a gelatinizing agent at the concentration employed, and b. spraying the mixture onto the mine interior surface.

12. A fire-retarding coated mine interior as in claim 11, wherein the mine interior surface is a shaft, an entry or a tunnel.

13. A fire-retarding coated mine interior as in claim 11, wherein the foam-forming reaction is carried out in the presence of a non-ionic suspending agent for the alumina trihydrate with said suspending agent being carried in the water phase in an amount not exceeding about 2 parts per 100 parts of the prepolymer.

14. A fire-retarding coated mine interior as in claim 11, wherein the prepolymer is a mixture of a polyoxyethylene glycol and a polyhydric alcohol containing 3 or 4 hydroxyl groups per mole, said hydroxyl groups of the glycol and polyol being reacted with sufficient polyisocyanate to cap all of said hydroxyl groups.

15. A fire-retarding coated mine interior as in claim 11, wherein the alumina trihydrate has an average particle size of about 0.5 to about 120 microns.

16. A fire-retarding coated mine interior as in claim 11, wherein the phosphorous compound is ammonium polyphosphate.

17. A fire-retarding coated mine interior as in claim 11, wherein the alumina trihydrate is present in an amount from about 50 to about 400 parts by weight per 100 parts by weight of the prepolymer.

18. A fire-retarding coated mine interior as in claim 11, wherein the carbon compound is starch.

19. A fire-retarding coated mine interior as in claim 11, wherein the carbon compound is wood cellulose.

20. A fire-retarding coated mine interior as in claim 19, wherein the wood cellulose is present from about 2 to about 5 parts by weight of the prepolymer.

21. A fire-retarding and insulating member comprising a substrate having coated thereon a fire-retarding polyurethane foam prepared by a. mixing a foam-forming composition comprising
  (1) hydrophilic polyoxyalkylene urethane prepolymer,
  (2) water in an amount of at least 20 moles of water for every mole of NCO groups in the prepolymer, and
  (3) at least a three-part fire-retarding additive mixture comprising
    (i) a phosphorous fire-retardant compound,
    (ii) alumina trihydrate carried in the water phase, and
    (iii) a water-dispersible and combustible organic carbon compound having from 0.1 to 1.0 hydroxyl group for every carbon atom present in said carbon compound, said carbon compound being carried in the water phase and being present from about 5 to about 30 parts by weight based on 100 parts by weight of the prepolymer, provided that when said carbon compound is wood cellulose it is present from about 2 to about 10 parts by weight of the prepolymer, and said carbon compound not functioning as a gelatinizing agent at the concentration employed, and b. spraying the mixture onto the substrate.

22. A fire-retarding and insulating member as in claim 21, wherein the substrate is a building.

* * * * *